United States Patent [19]
Blatt

[11] Patent Number: 4,719,847
[45] Date of Patent: Jan. 19, 1988

[54] FLUID PRESSURE OPERATED MOTOR WITH POSITIVE LOCATING DEVICE

[76] Inventor: Leland F. Blatt, P.O. Box 220, Fraser, Mich. 48026

[21] Appl. No.: 4,619

[22] Filed: Jan. 20, 1987

[51] Int. Cl.⁴ .......... F16J 15/18
[52] U.S. Cl. .......... 92/168; 92/13.6
[58] Field of Search .......... 92/168 PR, 13.6

[56] References Cited

U.S. PATENT DOCUMENTS

| | | | |
|---|---|---|---|
| 3,979,999 | 9/1976 | Emeuaker | 92/165 PR |
| 4,430,923 | 2/1984 | Iuaba | 92/165 PR |

FOREIGN PATENT DOCUMENTS

| | | | |
|---|---|---|---|
| 2306630 | 9/1974 | Fed. Rep. of Germany | 92/165 PR |
| 2434302 | 1/1976 | Fed. Rep. of Germany | 92/165 PR |

*Primary Examiner*—Harold W. Weakley
*Attorney, Agent, or Firm*—Basile and Hanlon

[57] ABSTRACT

A fluid pressure operated motor having a piston rod located in parallel offset relationship to the axis of the cylinder is provided with a fixed guide rod extending through the cylinder between the end caps in parallel offset relationship to the cylinder axis. The guide rod passes in sliding sealed relationship though a bore in the piston formed within like outwardly flared frusto-conical counterbores at each end. Complementary opposed frusto-conical locator members coaxially mounted at spaced fixed locations on the guide rod are seated respectively in the counterbores in the piston at opposite ends of the piston stroke to accurately locate the piston axially, radially and rotatively relative to the cylinder at each end of its stroke.

2 Claims, 1 Drawing Figure

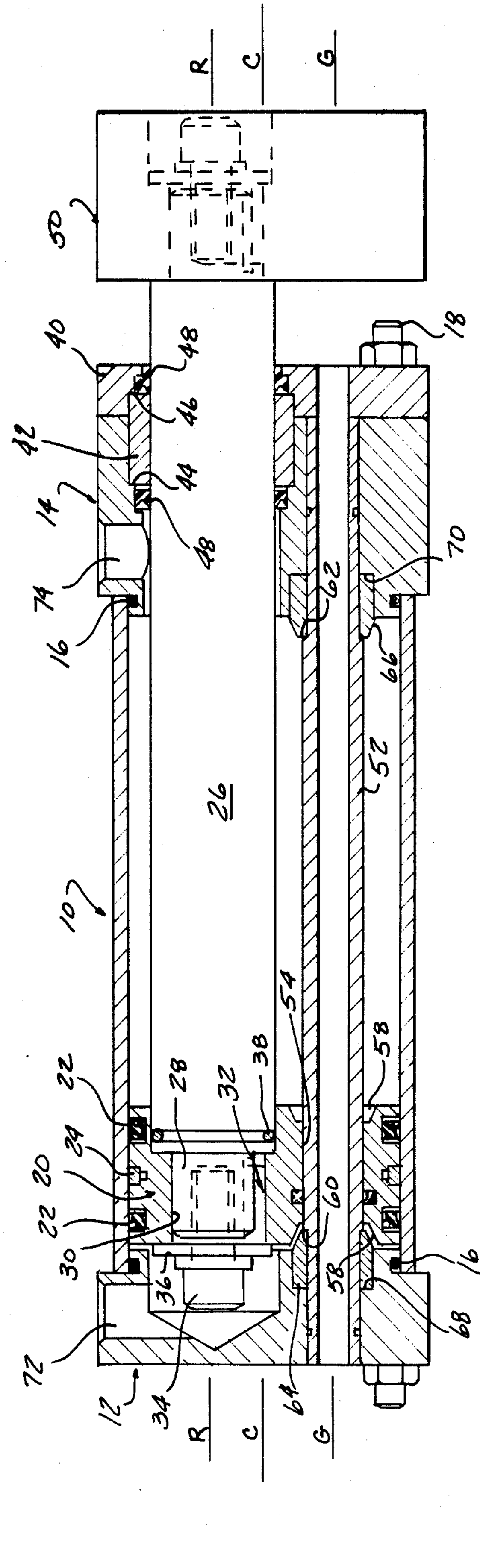
R
C
G
50
40
48
46
42
44
14
48
74
16
18
70
62
66
26
52
10
54
38
32
28
22
24
20
22
30
36
60
58
58
16
68
72
12
34
64
R
C
G

FLUID PRESSURE OPERATED MOTOR WITH POSITIVE LOCATING DEVICE

BACKGROUND OF THE INVENTION

The present invention is directed to improvements in fluid pressure operated motors by means of which the piston may be positively and precisely located at either end of its working stroke.

The increasing reliance of manufacturers, particularly in the automotive field, upon automated assembly operations has resulted in the employment of the conventional piston-cylinder fluid pressure operated motor to drive a tool or part from a rest position to a working position in increasingly complex operations. While motors of this type are generally considered to be of extremely simple construction, such motors constructed to economically practical manufacturing tolerances frequently are incapable of positioning a part or tool with the degree of precision required by some of the more sophisticated automated operations.

The present invention is especially directed to a structural relationship of relatively simple parts which will positively and precisely locate the piston of a fluid pressure actuated motor at each of the opposite end limits of its stroke relative to its cylinder.

SUMMARY OF THE INVENTION

In accordance with the present invention, a piston is mounted within a cylinder hydraulically closed at its opposite ends by end cap assemblies. The piston carries a piston rod which projects through a suitable guide bushing and sliding seal in one of the end caps. The longitudinal axis of the piston rod is located in parallel offset relationship to the central longitudinal axis of the cylinder.

A fixed guide rod is mounted within the cylinder, with its opposite ends fixedly received within the respective end caps, and extends between the end caps in spaced parallel relationship to the piston rod. The guide rod is slidably and sealingly received within a guide bore passing axially through the piston. Frusto-conical counterbores are formed in the piston at opposite end faces of the piston. Frusto-conical locator members are mounted on the guide rod and held in position axially of the rod by engagements between a seat formed on the end cap and an opposed radial shoulder formed on the rod. The frusto-conical locator members are complementary in shape to the frusto-conical counterbores, in the opposite end faces of the piston, and are seated within the counterbores to establish an end limit of movement of the piston axially of the cylinder. The locator members also automatically position the piston radially and circumferentially of the cylinder axis when seated in the bore so that the piston is precisely located axially, radially, and rotatively with respect to the cylinder axis at each end of its stroke.

Other objects and features of the invention will become apparent by reference to the following specification and to the drawing.

IN THE DRAWINGS

The single FIGURE of drawings is a cross-sectional view of a fluid pressure operated motor, embodying the invention, taken in a plane passing through the axis of the cylinder.

Referring to the drawing, a double acting fluid pressure operated motor embodying the present invention includes a hollow cylinder designated generally 10 closed at its opposite ends by a blind end cap designated generally 12 and a rod end cap designated generally 14. Cylinder 10 is sealed to the end caps, as by O-rings 16, and is mechanically clamped between the two end caps by any suitable means such as tie rods 18, one of which is illustrated at 18.

A piston designated generally 20 is slidably received within cylinder 10 and slidably sealed around its periphery to the inner wall of the cylinder as by seals 22 and wear band 24. A piston rod 26 is formed with an integral reduced diameter end section 28 received within a first bore 30 through piston 20. Rod 26 is maintained against rotation relative to bore 30 as by a key connection designated generally 32 and the rod is securely held to the piston by a cap screw 34 threaded into the reduced diameter section 28 and bearing against a spacer 36 engaged with the left hand face of piston 20 as viewed in the drawing. An O-ring seal at 38 provides a fluid seal between the rod and piston.

The longitudinal axis of piston rod 26 indicated by line R—R is parallel to, but offset from the central longitudinal axis of cylinder 10, indicated by line C—C. Piston rod 26 projects through rod end cap 14 and a retainer plate 40. A rod guide bearing 42 is mounted between opposed shoulders 44, 46 in end cap 14 and retainer plate 40 respectively to slidably receive piston rod 26 with a close sliding fit. Rod seals 48 slidably and sealingly engage rod 26 at opposite ends of guide bearing 42. The external end of piston rod 26 fixedly carries a mounting block 50 whose construction may take any of several forms specifically adapted to carry or mount a tool, fixture or part on rod 26.

An elongate guide rod 52 is fixedly mounted at its opposite ends in end caps 12 and 14 and passes through and is slidably received within a bore 54 through piston 20. At each of the opposite ends of bore 54 through the piston rod, like outwardly flared frusto-conical counterbores 58 are formed in the opposed end faces of piston 20.

The opposite end portions of guide rod 52 are formed of a slightly reduced diameter to define radial shoulders 60, 62 respectively facing the adjacent ends of rod 52. Like frusto-conical locator members 64, 66 respectively are mounted upon rod 52 with one end of the sleeve-like locator members bearing against the radial shoulders 60, 62 and the opposite end of the locator being engaged within a counterbored seat 68, 70 formed respectively in end caps 12 and 14.

In the drawing, piston 20 is shown closely adjacent, but spaced slightly to the right from, its left-hand end limit of movement within cylinder 10. It will be noted that the frusto-conical locator member 64 is complementary in shape to the frusto-conical counterbore 58, in the left-hand face of piston 20, and that further movement of piston 20, to the left as viewed in the drawing, will cause the frusto-conical locator member 64 to snugly seat in counterbore 58. The longitudinal axis G—G of guide rod 52 and the concentrically mounted locator members 64, 66 is parallel to, and offset from the central axis CC of the cylinder and thus, as locator 64 seats in counterbore 58 this seating action will precisely locate piston 20, both radially and rotatively, relative to the cylinder axis. Further, when this seating action is accomplished by the introduction of fluid under pressure into cylinder 10 via port 74 in rod end cap 14, the seating engagement between locator 64 and counterbore 56 will precisely establish the axial end limit of movement of piston 20 to the left relative to cylinder 10.

Similarly, when piston 20 is driven to the right as viewed in the drawing by the introduction of fluid under pressure into the cylinder via port 72, in rod and end cap 12, the piston will move to the right as viewed in the drawing until the counterbore 58, in its right-hand face, is firmly seated against locator 66.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a hydraulic motor including a hollow cylinder closed at its opposite ends by end cap means, a piston slidably and sealingly received within said cylinder, and a piston rod fixedly secured at one end to said piston and projecting axially of said cylinder through one of said end cap means in sliding sealed relationship therewith;

the improvement comprising means defining a bore extending axially through said piston in parallel offset relationship to the axis of said cylinder and terminating at each end in an outwardly flared frusto-conical counterbore, an elongate guide rod fixedly mounted at its opposite ends in said end cap means and extending through said bore in sliding sealed relationship therewith in parallel offset relationship to the axis of said cylinder, and a pair of coaxial frusto-conical locator members respectively complementary to said counterbores fixedly mounted on said guide rod adjacent the respective opposite ends thereof complementary to and engageable in said counterbores to establish the location of said piston axially, radially and rotatively relative to said cylinder at said opposite end limits of movement.

2. The invention defined in claim 1 further comprising means defining reduced diameter end sections of said guide rod extending axially from each end thereof to terminate at respective radial shoulders, said locator members comprising hollow sleeve-like members slidably received respectively on said reduced diameter sections with the small diameter ends of said frusto-conical members in abutment with said radial shoulders, means on each of said end cap means defining a bore adapted to receive an end section of said guide rod, and means on each of said end cap means axially engageable with a locator member to maintain the small diameter end of the locator member in engagement with its associated radial shoulder.

* * * * *

UNITED STATES PATENT AND TRADEMARK OFFICE
CERTIFICATE OF CORRECTION

PATENT NO. : 4,719,847

DATED : January 19, 1988

INVENTOR(S) : Leland F. Blatt

It is certified that error appears in the above-identified patent and that said Letters Patent is hereby corrected as shown below:

On the Title Page, in the Abstract, Section [57], line 6, delete "though" and insert --through--.

Column 3, line 1, delete "56" and insert --58--.

Signed and Sealed this

Ninth Day of August, 1988

*Attest:*

DONALD J. QUIGG

*Attesting Officer*

*Commissioner of Patents and Trademarks*